United States Patent [19]

Ogiro et al.

[11] Patent Number: 4,583,137
[45] Date of Patent: Apr. 15, 1986

[54] SIGNAL-RECORDING/REPRODUCING APPARATUS

[75] Inventors: Kenji Ogiro; Nobuyuki Kaku; Kyuichiro Nagai, all of Yokohama; Morio Umemura, Chigasaki, all of Japan

[73] Assignee: Hitachi, Ltd., Tokyo, Japan

[21] Appl. No.: 389,076

[22] Filed: Jun. 16, 1982

[30] Foreign Application Priority Data

Jun. 24, 1981 [JP] Japan ................................. 56-96663

[51] Int. Cl.⁴ ............................................. G11B 15/66
[52] U.S. Cl. ......................................... 360/85; 360/95
[58] Field of Search ....................... 360/83, 84, 85, 93, 360/94, 95

[56] References Cited

U.S. PATENT DOCUMENTS 3,821,805  6/1974  Serizawa ............................... 360/85
3,845,501 10/1974  Katsuta et al. ......................... 360/85
4,091,168  5/1978  Kawamata ............................ 428/416
4,126,888 11/1978  Hayashi et al. ........................ 360/85

Primary Examiner—John H. Wolff
Assistant Examiner—David J. Severin
Attorney, Agent, or Firm—Antonelli, Terry & Wands

[57] ABSTRACT

Signal-recording/reproducing apparatus for use with a tape cassette includes a cylinder having mounted thereon heads for recording and reproducing a signal on and from a magnetic tape within the tape cassette, respectively. A pair of tape guides are movable between an unloading position remote from the cylinder and a loading position adjacent thereto. The tape is withdrawn out of the tape cassette by the tape guides when they are moved from the unloading position to the loading position. When the tape guides are in the loading position, an angular extent over which the tape is in contact with a non-rotatable guide element of one of the tape guides located at an exit side where the tapes leaves the cylinder is less than that over which the tape is in contact with a non-rotatable guide element of the other tape guide located at an approaching side where the tape approaches the cylinder.

8 Claims, 13 Drawing Figures

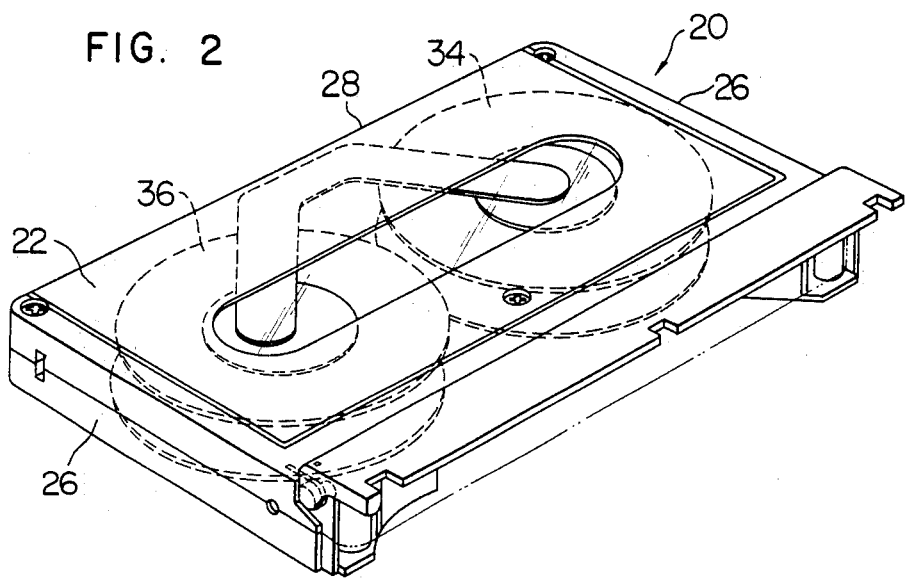
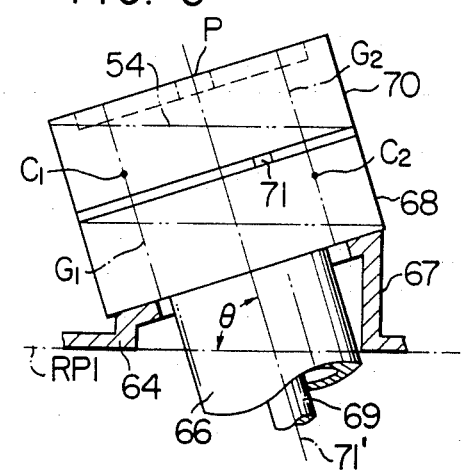
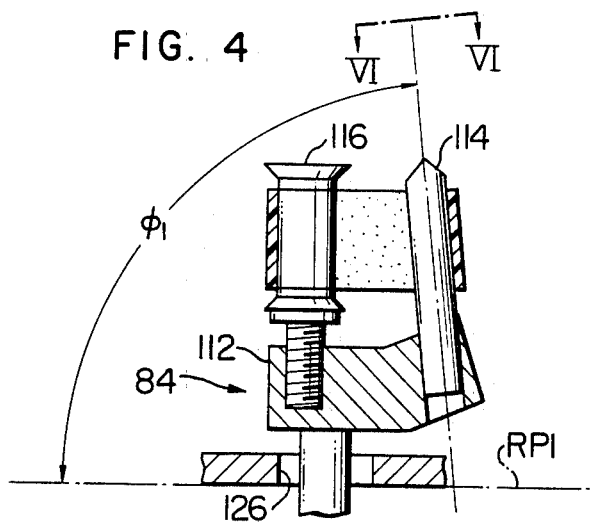

SIGNAL-RECORDING/REPRODUCING APPARATUS

BACKGROUND OF THE INVENTION

Field of the Invention

The present invention relates to signal-recording/reproducing apparatus for use with a tape cassette.

A signal-recording/reproducing apparatus is disclosed in U.S. Pat. No. 4,138,699, which includes a cylinder having mounted thereon heads for respectively recording and reproducing a signal on and from a magnetic tape within the tape cassette, and a pair of tape guides movable between an unloading position remote from the cylinder and a loading position adjacent thereto. The tape is withdrawn out of the tape cassette by the pair of tape guides when they are moved from the unloading position to the loading position. When the pair of tape guides are in the loading position, one of the tape guides is located at an approaching side of the cylinder where the tape approaches the cylinder and the other tape guide is located at an exit side of the cylinder where the tape leaves the cylinder, to guide the tape so as to be helically wound around the cylinder over a predetermined angular extent.

Each of the pair of tape guides includes a non-rotatable guide element. When the pair of tape guides are in the loading position, an angular extent over which the tape is in contact with the guide element of the one tape guide is the same as that over which the tape is in contact with the guide element of the other tape guide.

The considerable angular extent over which the tape is in contact with the guide element of the other tape guide causes a sliding resistance between the tape and the guide element to be increased to increase a tension applied to the tape. The increase in tape tension results in an increase in driving force for driving the tape. This causes the apparatus to be large-sized. In addition, the increase in tape tension causes a thin tape having its thickness of approximately 10 μm, for example, to be damaged. That is, if the tension applied to the thin tape is high, the elongation of tape would be increased and the fluctuation in speed of the tape would occur. Moreover, the repeated use of the tape causes a permanent deformation or plastic strain to occur in the tape so that the edges of the tape will be damaged.

SUMMARY OF THE INVENTION

An object of the present invention is to provide signal-recording/reproducing apparatus for use with a tape cassette, which enables the tension on the tape at the leaving side of the cylinder to be reduced.

According to the present invention, there is provided signal-recording/reproducing apparatus for use with a tape cassette which includes a cylinder having mounted thereon heads for recording and reproducing a signal on and from a magnetic tape within the tape cassette, respectively and a pair of tape guide means movable between an unloading position remote from the cylinder and a loading position adjacent to the cylinder, with the tape being withdrawn out of the tape cassette by the pair of tape guide means when they are moved from the unloading position to the loading position. The pair of tape guide means are brought into contact with the opposite side of the tape and the tape is withdrawn when the pair of tape guide means are moved from the unloading position to the loading position to bring the magnetizable side of the tape into contact with the cylinder. One of the tape guide means is located at an approaching side of the cylinder where the tape approaches the cylinder and the other tape guide means is located at an exit side of the cylinder where the tape leaves the cylinder when the pair of tape guide means are in the loading position, to guide the tape so as to be helically wound around the cylinder over a predetermined angular extent. Each of the pair of tape guide means includes a non-rotatable cylindrical guide element, an angular extent over which the tape is in contact with the guide element of the other tape guide means being less than that over which the tape is in contact with the guide element of the one tape guide means when the pair of tape guide means are in the loading position. The tape extends directly from the non-rotatable guide element of one of the tape guide means to the cylinder and the tape extending directly from the cylinder to the non-rotatable guide element of the other tape guide means when the pair of tape guide means are in the loading position.

BRIEF DESCRIPTION OF THE DRAWINGS

FIG. 2 is an enlarged perspective view of a tape cassette shown in FIG. 1;

FIG. 3 is an enlarged cross-sectional view taken along the line III—III of FIG. 1 with the tape shown by the phantom line;

FIG. 4 is an enlarged cross-sectional view taken along the line IV—IV of FIG. 1 with the tape shown as having an exaggerated thickness;

DETAILED DESCRIPTION

Figure 1:
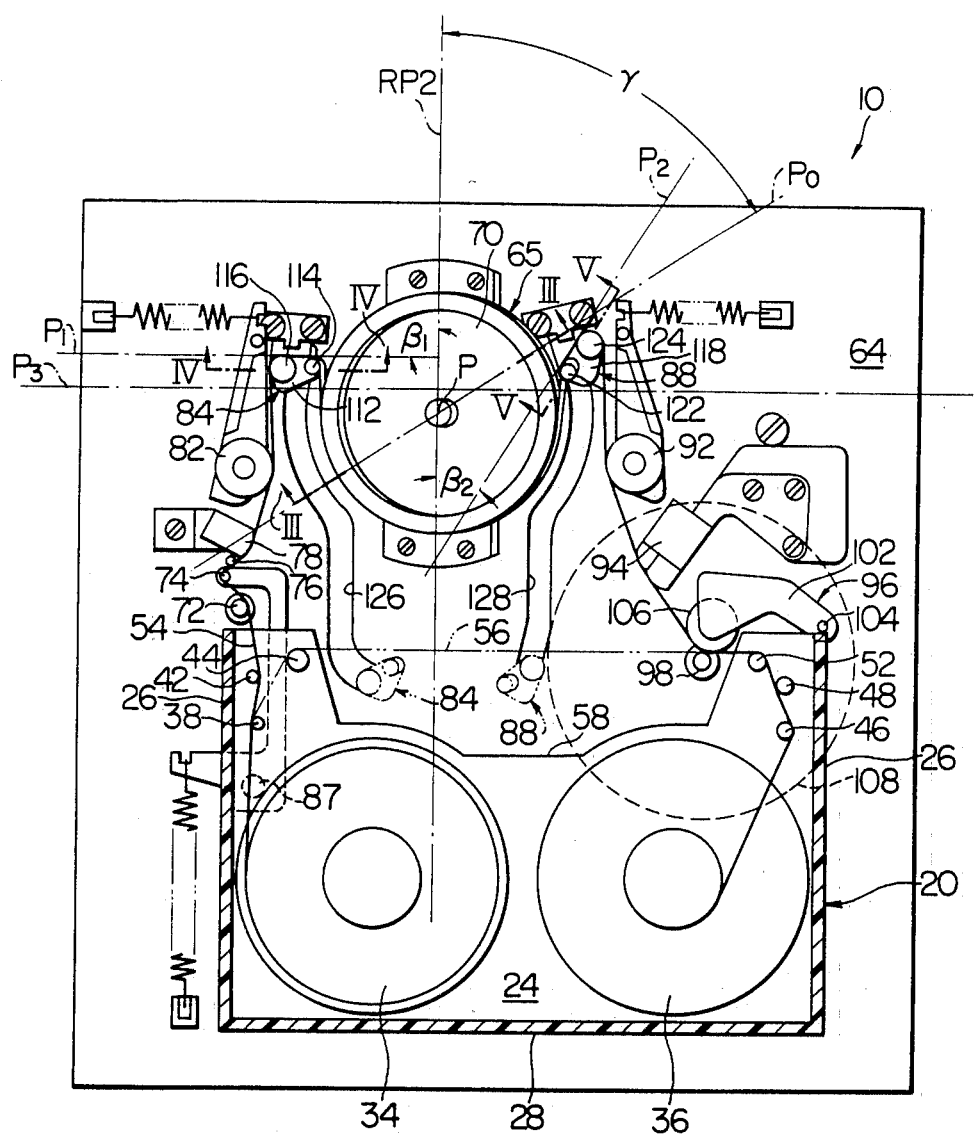
FIG. 1 is a schematic plan view illustrating signal-recording/reproducing apparatus in accordance with an embodiment of the present invention with a pair of tape guides in loading position shown by the solid line and the tape guides in unloading position shown by the phantom line.

Referring now to the drawings, wherein like reference numerals are used throuhout the various views to designate like parts and, more particularly, to FIG. 1, there is shown signal-recording/reproducing apparatus generally designated by the reference numeral 10 is provided for use with a tape cassette generally designated by the reference numeral 20, and, as best shown, in FIG. 2, the tape cassette 20 includes a casing having parallel top and bottom wall 22, 24, a pair of parallel side walls 26, a rear wall 28 and an open front end. A supply reel 34 and a take-up reel 36 are rotatably disposed within the casing. Guide posts 38, 42 and 44 have their axes perpendicular to the top and bottom walls 22, 24 of the casing and are located adjacent to one of the pair of the side walls 26. Guide posts 46, 48 and 52 corresponding to the guide posts 38, 42 and 44, are located adjacent to the other side wall 26. A thin magnetic tape 54, of a thickness of approximately 10 μm, for example, has its ends secured to the supply reel 34 and the take-up reel 36, respectively, and is wound around the supply reel 34. The magnetic tape 54 includes a magnetizable side and an opposite side. When the apparatus 10 is in an unloading condition described hereinafter, the tape 54 is guided by the tape guide posts 38, 44, 46, and 52 and has a portion 56 shown by the phantom line and extending between the guide posts 44 and 52 adjacent to the open front end of the casing of the tape cassette. A notch 58 is formed in the bottom wall 24 adjacent to the open front end of the casing.

The recording/reproducing apparatus 10 includes a base frame 64 and a cylinder assembly 65, with the cylinder assembly 65, as shown in FIG. 3, including a fixed hollow shaft 66 extending through the base frame 64, a lower fixed cylinder 68 fixedly mounted on the hollow shaft 66 and seated on an annular projection 67 on the base frame 64, a rotatable shaft 69 extending within the hollow shaft 66 in concentric relation thereto, and an upper rotatable cylinder 70 mounted on the rotatable shaft 69 for rotation therewith. The upper rotatable cylinder 70 has a cylindrical peripheral surface identical in diameter with that of the lower fixed cylinder 68 and is axially spaced therefrom. A pair of diametrically opposed heads 71 are disposed between the upper and lower cylinders 70 and 68 and are mounted on the upper rotatable cylinder 70 for rotation therewith relative to the lower fixed cylinder 68 for recording and reproducing a signal on and from the tape 54, respectively. An axis 71' of the cylinder assembly 65 is, as shown in FIG. 3, inclined at a predetermined angle $\theta$ ranging from approximately 80 to 88 degrees less than 90 degrees in a plane Po with respect to a first reference plane RP1 which, in the illustrated embodiment, for example, is shown as being parallel to the top and bottom walls 22, 24 of the casing of the tape cassette 20. The plane $P_0$ will be further described in detail hereinbelow.

Located at an approaching side of the cylinder assembly 65 where the tape 54 approaches the cylinder assembly from the supply reel 34 are a pin 72 for guiding the travelling or movement of the tape, a movable pin 74 abutting against the tape 54 for detecting a tension applied to the tape to control the tape tension under travelling, a pin 76 for guiding the travelling of the tape 54, an erasing head 78 for demagnetizing the entire width of the tape 54, an impedance roller 82 for absorbing and damping the oscillation or vibration of the tape 54 during the travelling thereof and a movable tape guide 84. The pins 72, 76 have their axes perpendicular to the first reference plane RP1 and are fixed to the base frame 64. The movable control pin 74 has its axis perpendicular to the first reference plane RP1 and is pivotable around a pivot 87 fixed to the base frame 64 between a loading position shown by the solid line in FIG. 1 and a not-shown unloading position. The erasing head 78 is fixed to the base frame 64. The impedance roller 82 is supported by the base frame 64 for rotation around an axis perpendicular to the first reference plane RP1.

Located at a an exit side of the cylinder assembly 65 where the tape 54 leaves the cylinder assembly toward the take-up reel 36 are a movable tape guide 88, an impedance roller 92 similar to the impedance roller 82, a composite head 94, a pinch roller assembly 96 and a capstan 98. The composite head 94 is supported by the base frame so as to be adjustable in position and inclination and comprises a demagnetizing head exclusive for a voice signal track and operative during the recording of the voice signal, a magnetic head for recording/reproducing the voice signal, and a control head for controlling the travelling speed and phase of the tape 54. The pinch roller assembly 96 comprises a bracket 102 pivotable around a pivot 104 fixed to the base frame 64 and a pinch roller 106 rotatably mounted on the bracket. The capstan 98 is connected to a fly-wheel 108 for rotation therewith and cooperates with the pinch roller 106 to drive or feed the tape 54 at a constant speed.

As best shown in FIG. 4, the tape guide 84 comprises a mount 112, a non-rotatable cylindrical guide element or guide pin 114 fixed to the mount, and a cylindrical guide element or guide roller 116 rotatably mounted on the mount 112. Similarly, the tape guide 88 comprises a mount 118, a non-rotatable cylindrical guide element or guide pin 122 fixed to the mount, and a cylindrical guide element or guide roller 124 rotatably mounted on the mount 118. The tape guides 84, 88 are movable along respective slots 126, 128 in the base frame 64 in parallel relation to the first reference plane RP1 between an unloading position shown in FIG. 1 by the phantom line and a loading position shown in FIG. 1 by the solid line. In the unloading position, the tape guides 84, 88 are located within the notch 58 of the tape cassette 20 with the portion 56 of the tape 54 positioned between the tape guides and the cylinder assembly 65. As the tape guides 84, 88 are moved from the unloading position to the loading position, the tape is withdrawn out of the tape cassette 20 by the tape guides 84, 88. In the loading position, the tape guides 84, 88 guide the tape 54 such that the tape is helically would around the cylinders 68, 70 over a predetermined angular extent more than 180 degrees, for example. A mechanism for moving the tape guides 84 and 88 between the loading position and the unloading position may be a well-known mechanism, such as disclosed in, for example, U.S. Pat. No. 4,138,699.

Figure 5:
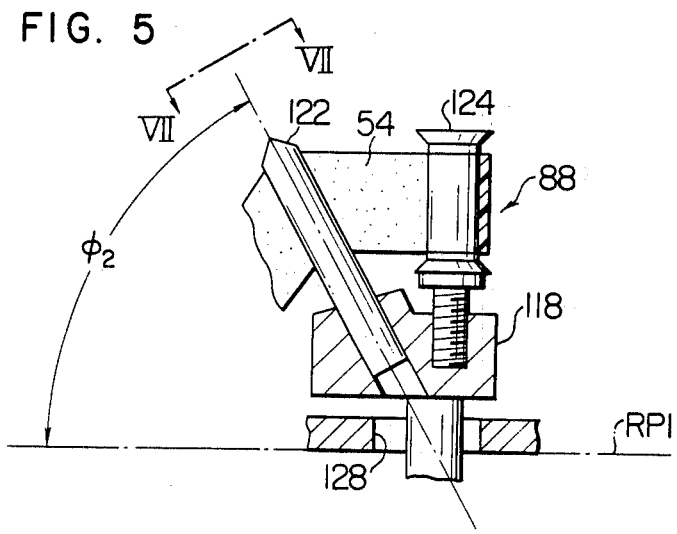
FIG. 5 is an enlarged cross-sectional view taken along the line V—V of FIG. 1 with the tape shown as having an exaggerated thickness.

As shown in FIG. 1, when the tape guides 84, 88 are in the loading position, the guide pin 114, 122 of each of the tape guides 84, 88 is located between the cylinder assembly 65, the guide roller 116, 124. The guide rollers 116 and 124 are rotatable around respective axes perpendicularly to the first reference plane RP1. As shown in FIG. 4, the guide pin 114 of the tape guide 84 has its axis inclined at an angle $\phi_1$ with respect to the first reference plane RP1 in a plane substantially parallel to a plane $P_1$ shown in FIG. 1 and including the axis of the guide pin 114 and the axis of the guide roller 116. As shown in FIG. 5, the guide pin 122 has its axis inclined at an angle $\phi_2$ with respect to the first reference plane RP1 in a plane $P_2$ shown in FIG. 1 and includes the axis of the guide pin 122 and the axis of the guide roller 124. The angel $\phi_1$ is greater than the angle $\phi_2$. The planes $P_1$ and $P_2$ shown in FIG. 1 will be described in detail hereinafter. When the tape guides 84, 88 are in the loading position, the inclined guide pin 114 enables the tape 54 to approach the cylinders 68, 70 without twist or distortion, and the inclined pin 12 enables the tape 54 to leave the cylinders 68, 70 without twist or distortion.

In FIG. 1, a second reference plane RP2 is defined as a plane perpendicular to a third plane $P_3$ which is perpendicular to the first reference plane RP1 and includes a center point $C_1$ widthwise of the tape 54 shown in FIG. 3 on a generatrix $G_1$ shown in FIG. 3 by the phantom line on the cylindrical peripheral surfaces of the cylinders 68, 70 at which the contact of the tape 54 with the cylindrical peripheral surfaces of the cylinders 68, 70 is initiated at the approaching side and a center point $C_2$ widthwise of the tape 54 shown in FIG. 3 on a generatrix $G_2$ shown in FIG. 3 by the phantom line on the cylindrical peripheral surfaces of the cylinders 68, 70 at which the contact of the tape 54 with the peripheral surfaces of the cylinders 68, 70 is ended or terminated at the leaving side. In the embodiment illustrated in FIG. 1, the second reference plane RP2 is shown as passing through an intersection P of the axis 71' of the cylinder assembly 65 and the top surface of the upper rotatable cylinder 70 for convenience of explanation, but this is not critical or essential.

As shown in FIG. 1, the plane $P_1$ including a straight portion of the tape 54 extending between the roller 116 and pin 114 of the tape guide 84 in the loading position is perpendicular to the first reference plane RP1 and defines an angle $\beta_1$ with respect to the second reference plane RP2. The plane $P_2$ including a straight portion of the tape 54 extending between the roller 124 and the pin 122 of the tape guide 88 in the loading position is perpendicular to the first reference plane RP1 and defines an angle $\beta_2$ with respect to the second reference plane RP2. The angle $\beta_2$ is less than the angle $\beta_1$. For example, the angle $\beta_1$ may range from 90 to 120 degrees, and the angle $\beta_2$ may range from 20 to 40 degrees.

The axis 71' of the cylinder assembly 65 extends at the aforementioned angle $\theta$, as shown in FIG. 3, in the plane $P_0$ extending at an angle $\gamma$ with respect to the second reference plane RP2. The angle $\gamma$ is approximately 55 to 65 degrees.

Figure 6:
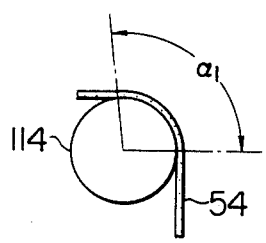
FIG. 6 is a view as viewed from the line VI—VI of FIG. 4 with the tape shown as having an exaggerated thickness.
Figure 7:
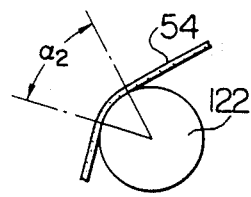
FIG. 7 is a view as viewed from the line VII—VII of FIG. 5 with the tape shown as having an exaggerated thickness.
Figure 9:
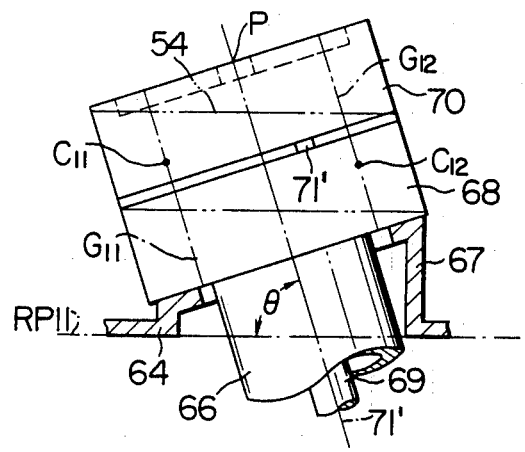
FIG. 9 is an enlarged cross-sectional view taken along the IX—IX of FIG. 8 with the tape shown by the phantom line.

As shown in FIGS. 6 and 7, the relation $\beta_2 < \beta_1$ enables the angular extent $\alpha_2$ over which the tape 54 is in contact with the non-rotatable pin 122 of the tape guide 88 in the loading position to be decreased as compared with the angular extent $\alpha_1$ over which the tape 54 is in contact with the non-rotatable pin 114 of the tape guide 84 in the loading position. In other words, the wrapping angle $\alpha_2$ at which the tape 54 is wound around the pin 122 is decreased as compared with the wrapping angle $\alpha_1$ at which the tape 54 is wound around the pin 114. Thus, the decrease in angular extent $\alpha_2$ over which the tape 54 is in contact with the non-rotatable pin 122 causes the frictional sliding resistance between the tape 54 and the pin 122 to be decreased to reduce the increase in a tension applied to the tape 54 in the exit side. The decrease in increase in tape tension causes the driving force for driving the tape to be decreased to enable the apparatus 10 to be small-sized. In addition, the decrease in tape tension prevents the tape from being excessively elongated to minimize the fluctuation in tape speed and the permanent deformation or plastic strain of the tape, to thereby minimize the damaging of the edges of the tape.

FIGS. 8-13 show another embodiment of the present invention.

Figure 8:
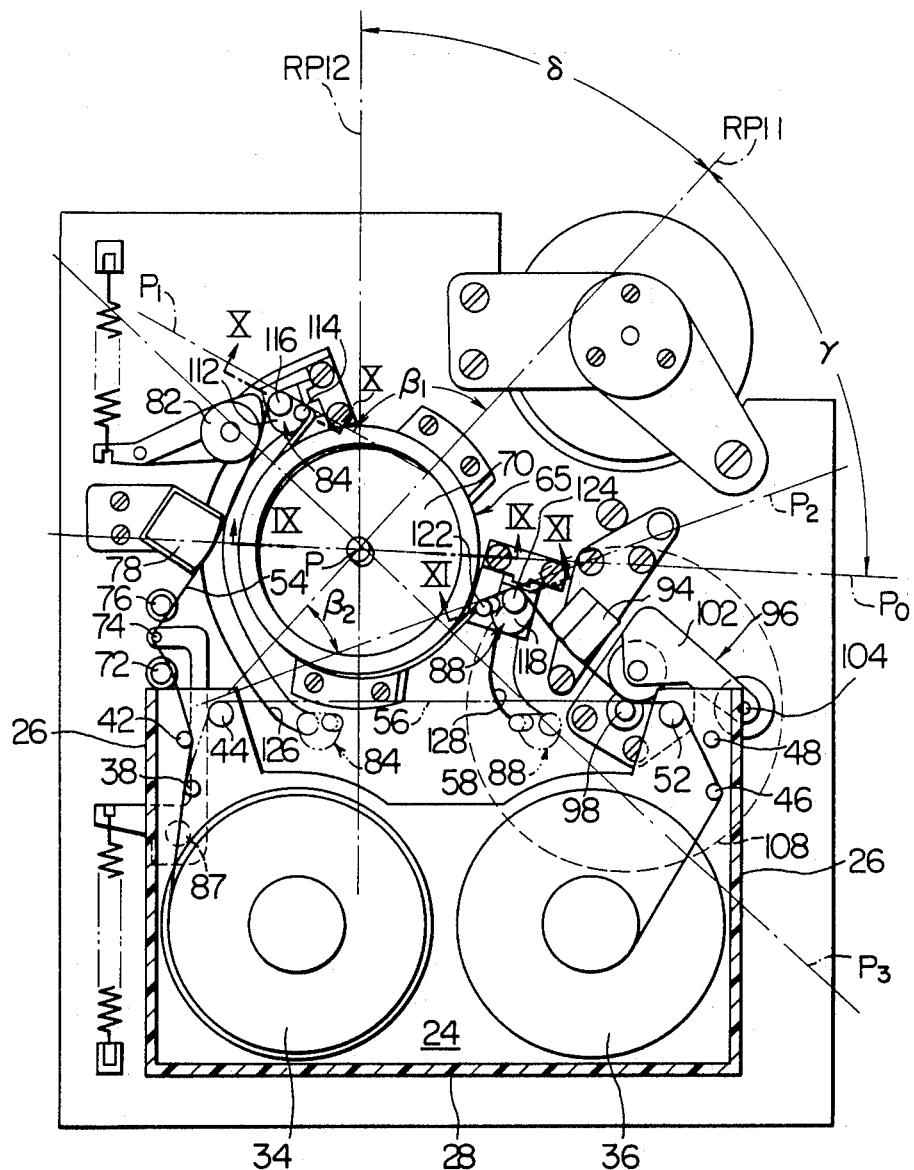
FIG. 8 is a schematic plan view showing another embodiment of the present invention.
Figure 10:
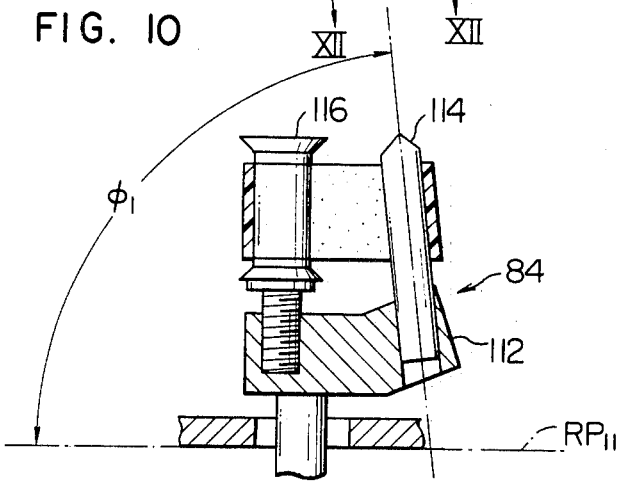
FIG. 10 is an enlarged cross-sectional view taken along the line X—X of FIG. 8 with the tape shown as having an exaggerated thickness.
Figure 11:
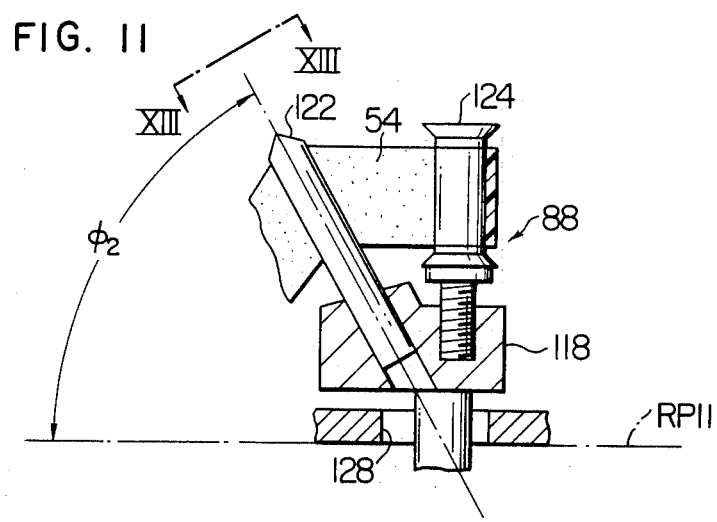
FIG. 11 is an enlarged cross-sectional view taken along the line XI—XI of FIG. 8 with the tape shown as having an exaggerated thickness.
Figure 12:
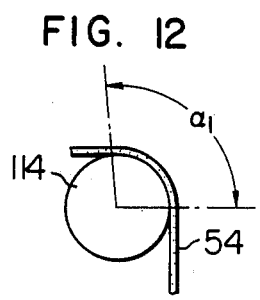
FIG. 12 is a view as viewed from the line XII—XII of FIG. 10 with the tape shown as having an exaggerated thickness.
Figure 13:
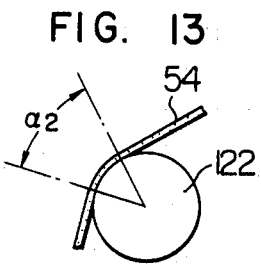
FIG. 13 is a view as viewed from the line XIII—XIII of FIG. 11 with the tape shown as having an exaggerated thickness.

The embodiment shown in FIGS. 8-13 is substantially identical in structure and operation with the first embodiment shown in FIGS. 1-7 except that the impedance roller 92 is not disposed in the exit side and that a second reference plane RP12 perpendicular to a plane $P_3$ which is perpendicular to a first reference plane RP11 and includes a center point $C_{11}$ widthwise of the tape 54 on a generatrix $G_{11}$ on the cylindrical peripheral surfaces of the cylinders 68, 70 at which the contact of the tape 54 with the cylindrical surfaces of the cylinders 68, 70 is initiated at the approaching side and a center point $C_{12}$ widthwise of the tape 54 on a generatrix $G_{12}$ on the cylindrical peripheral surface of the cylinders 68, 70 at which the contact of the tape 54 with the cylindrical peripheral surfaces of the cylinders 68, 70 is ended or terminated is angularly moved by an angle $\delta$ in the clockwise direction with respect to the second reference plane RP2 of the first embodiment shown in FIG. 8 by the phantom line. In the embodiment of FIGS. 8-13, the angle $\delta$ is approximately 60 to 80 degrees. The angles $\beta_1$, $\beta_2$, $\theta$, $\phi_1$, $\phi_2$, $\alpha_1$ and $\alpha_2$ shown in FIGS. 8-13 are respectively identical with those described with reference to FIGS. 1-7.

In the embodiment of FIGS. 8-13, since the second reference plane RP12 is angularly moved by the angle $\delta$ with respect to the second reference plane RP2 of the embodiment of FIGS. 1-7, the distance through which the tape guide 88 at the exit side moves from the unloading position shown by the phantom line to the loading position shown by the solid line is shorter than the distance through which the tape guide 84 at the approaching side moves from the unloading position shown by the phantom line to the loading position shown by the solid line. In other words, when the guides 84, 88 are in the loading position, the tape guide 88 at the leaving side is located closer to the tape cassette 20 than the tape guide 84 at the approaching side. This enables the path length of the tape 54 at the leaving side to be reduced, and also enables the cylinders 68, 70, capstan 98 and composite head 94 to be located close to each other, to thereby improve the stable travelling performance of the tape.

As described above, since the signal-recording/reproducing apparatus in accordance with the embodiments of the present invention is arranged such that the angular extent or wrapping angle over which the tape 54 is in contact with the non-rotatable guide pin 122 of the tape guide 88 at the exit side is decreased, the sliding frictional resistance between the guide pin 122 and the tape 54 is reduced, and the driving force required for driving the tape is also decreased to enable the apparatus to be small-sized. In addition, the decrease in sliding frictional resistance minimizes the tape elongation to minimize the damage on the edges of the tape.

It is not essential that the upper cylinder 70 is rotatable and that the cylinder assembly 65 has its axis 71' inclined at an angle less than 90 degrees with respect to the first reference plane RP1, RP11. The upper cylinder 70 may be fixedly connected to the lower cylinder 68 against rotation relative thereto, and the axis 71' of the cylinder assembly 65 may be perpendicular to the first reference plane RP1, RP11. The inclination of the guide pin 114, 122 of each of the tape guides 84 and 88 with respect to the first reference plane RP1, RP11 depends upon the inclination of the axis 71' of the cylinder assembly 65 with respect to the first reference plane RP1, RP11. If the inclination angle of the axis 71' of the cylinder assembly 65 with respect to the first reference plane RP1, RP11 is varied, the tape guides 84, 88 may take their loading positions different in level from their unloading position with the angles of planes extending between the loading positions and the unloading positions with respect to the first reference plane RP11 being varied dependent upon the variation of the inclination angle of the axis 71'.

What we claim is:

1. A signal-recording/reproducing apparatus for use with a tape cassette, the apparatus comprising:
   a cylinder having mounted thereon heads for respectively recording and reproducing a signal on and from a magnetic tape within the tape cassette, the magnetic tape having a magnetizable side and an opposite side;
   a pair of tape guide means movable between an unloading position remote from said cylinder and a loading position adjacent to said cylinder, said pair of tape guide means being brought into contact with the opposite side of the tape and withdrawing the tape out of the tape cassette when said pair of tape guide means are moved from said unloading position to said loading position to bring the magnetizable side of the tape into contact with said cylinder, one tape guide means being located at an approaching side of said cylinder where the tape approaches said cylinder and the other tape guide means being located at an exit side of said cylinder where the tape leads said cylinder when said pair of tape guide means are in said loading position, to guide the tape so as to be helically wound around said cylinder over a predetermined angular extent;
   each of said pair of tape guide means including a non-rotatable cylindrical guide element, the tape extending directly from said non-rotatable guide element of said one tape guide means to said cylinder and the tape extending directly from said cylinder to said non-rotatable guide element of said other tape guide means when said pair of tape guide means are in said loading position, an angular extent over which the tape is in contact with said non-rotatable guide element of said other tape guide means being less than that over which the tape is in contact with said non-rotatable guide element of said one tape guide means when said pair of tape guide means are in said loading position; and,
   wherein said pair of tape guide means includes a rotatable cylindrical guide element in addition to said non-rotatable guide element, said non-rotatable guide element of each of said pair of tape guide means being located between said cylinder and said rotatable guide element when said pair of tape guide means are in said loading position.

2. A signal-recording/reproducing apparatus for use with a tape cassette, comprising:
   a cylinder having mounted thereon heads for respectively recording and reproducing a signal on and from a magnetic tape within the tape cassette, the magnetic tape having a magnetizable side and an opposite side;
   a pair of tape guide means movable between an unloading position remote from said cylinder and a loading position adjacent to said cylinder, said pair of tape guide means being brought into contact with the opposite side of the tape and withdrawing the tape out of the tape cassette when said pair of tape guide means are moved from said unloading position to said loading position to bring the magnetizable side of the tape into contact with said cylinder, one of said tape guide means being located at an approaching side of said cylinder where the tape approaches said cylinder and the other tape guide means being located at an exit side of said cylinder where the tape leads said cylinder when said pair of tape guide means are in said loading position, to guide the tape so as to be helically wound around said cylinder over a predetermined angular extent;
   each of said pair of tape guide means including a non-rotatable cylindrical guide element, the tape extending directly from said non-rotatable guide element of said one tape guide means to said cylinder and the tape extending directly from said cylinder to said non-rotatable guide element of said other tape guide means when said pair of tape guide means are in said loading position, an angular extent over which the tape is in contact with said non-rotatable guide element of said other tape guide means being less than that over which the tape is in contact with said non-rotatable guide element of said one tape guide means when said pair of tape guide means are in said loading position; and
   wherein each of said pair of tape guide means includes a rotatable cylindrical guide element in addition to said non-rotatable guide element, said non-rotatable guide element of each of said pair of tape guide means being located between said cylinder and said rotatable guide element when said pair of tape guide means are in said loading position, wherein a first plane including a straight portion of the tape extending between said rotatable guide element and said non-rotatable guide element of said tape guide means, in said loading position, extends at a first angle with respect to a first reference plane which is perpendicular to a second plane including a center point widthwise of the tape of a generatrix of a cylindrical outer surface of said cylinder at which the contact of the tape with said cylinder is initiated at said approaching side and a center point widthwise of the tape of a generatrix of the cylindrical outer surface of said cylinder at which the contact of the tape with said cylinder is terminated at said exit side, said first and second planes and said first reference plane being perpendicular to a second reference plane which is perpendicular to an axis of said rotatable guide element of each of said pair of tape guide means, and wherein a third plane including a straight portion of the tape extending between said non-rotatable guide element and said rotatable guide element of said other tape guide means, in said loading position, is inclined at a second angle with respect to said first reference plane, said second angle being less than said first angle.

3. Apparatus defined in claim 2, wherein said cylinder has its axis inclined at an angle less than 90 degrees with respect to said second reference plane in a fourth plane extending at a third angle with respect to said first reference plane, said pair of tape guide means being movable between said loading and unloading positions in parallel relation to said second reference plane.

4. Apparatus defined in claim 3, wherein said rotatable guide elements of said one and the other tape guide means have their axes perpendicular to said second reference plane and said non-rotatable guide elements of said one and the other tape guide means have their axes extending at angles with respect to said second reference plane in said first and third planes, respectively.

5. Apparatus defined in any one of claims 1–4, wherein the minimum distance between said other tape guide means and a tape cassette is less than that between said one tape guide means and the tape cassette when said one and the other tape guide means are in said loading position.

6. Apparatus defined in claim 5, wherein said cylinder is rotatable around its axis.

7. Apparatus defined in claim 6, wherein said magnetic tape has its thickness of approximately 10 μm.

8. A signal-recording/reproducing apparatus for use with a tape cassette, comprising:
- a cylinder having mounted thereon heads for respective recording and reproducing a signal on and from a magnetic tape within the tape cassette, the magnetic tape having a magnetizable side and an opposite side;
- a pair of tape guide means movable between an unloading position remote from said cylinder and a loading position adjacent to said cylinder, said pair of tape guide means being brought into contact with the opposite side of the tape and withdrawing the tape out of the tape cassette when said pair of tape guide means are moved from said unloading position to said loading position to bring the magnetizable side of the tape into contact with said cylinder, one of said tape guide means being located at an approaching side of said cylinder where the tape approaches said cylinder and the other tape guide means being located at an exit side of said cylinder where the tape leaves said cylinder when said pair of tape guide means are in said loading position to guide the tape so as to be helically wound around said cylinder over a predetermined angular extent; and
- each of said pair of tape guide means including a mount, a non-rotatable cylindrical guide element fixedly mounted on said mount a rotatable guide element, said non-rotatable guide element of each of said pair of tape guide means being located between said cylinder and said rotatable guide element when said pair of tape guide means are in said loading position, said pair of tape guide means in said loading position being arranged such that an angular extent over which the tape is in contact with said non-rotatable guide element of said other tape guide means is less than that over which the tape is in contact with said non-rotatable guide element of said one tape guide means.

* * * * *